US006247710B1

(12) United States Patent
Luberda

(10) Patent No.: US 6,247,710 B1
(45) Date of Patent: Jun. 19, 2001

(54) HAND TRUCK HAVING DETACHABLE CARRIER FOR BOTTLED WATER CONTAINER AND METHODS OF ITS CONSTRUCTION AND OPERATION

(75) Inventor: Ryan D. Luberda, Standish, MI (US)

(73) Assignee: Magline, Inc., Pinconning, MI (US)

( * ) Notice: Subject to any disclaimer, the term of this patent is extended or adjusted under 35 U.S.C. 154(b) by 0 days.

(21) Appl. No.: 09/268,190

(22) Filed: Mar. 15, 1999

Related U.S. Application Data
(60) Provisional application No. 60/078,155, filed on Mar. 16, 1998.

(51) Int. Cl.⁷ ....................................................... B62B 1/12
(52) U.S. Cl. .................................. 280/47.28; 280/47.24; 280/47.18
(58) Field of Search .............................. 280/47.17, 47.18, 280/47.19, 47.24, 47.27, 47.28, 47.29, 63, 79.2, 79.5; 224/148.1, 148.4, 148.7, 926; 248/129, 215, 310

(56) References Cited

U.S. PATENT DOCUMENTS

| | | | | |
|---|---|---|---|---|
| 2,472,670 | * | 6/1949 | McFarland | 280/47.18 |
| 2,933,358 | * | 4/1960 | Sheble et al. | 224/926 |
| 3,436,093 | | 4/1969 | Ruffley, Jr. . | |
| 3,738,601 | * | 6/1973 | Gehringer | 248/310 |
| 4,121,855 | * | 10/1978 | Mortenson | 280/47.29 |
| 4,753,445 | | 6/1988 | Ferrare | 280/47.131 |
| 5,104,135 | | 4/1992 | Sheets | 280/47.19 |
| 5,123,666 | * | 6/1992 | Moore | 280/47.18 |
| 5,465,987 | * | 11/1995 | Della Vecchia | 280/47.18 |
| 5,749,588 | * | 5/1998 | Stallbaumer | 280/47.17 |
| 5,913,527 | * | 6/1999 | Hailston | 280/47.24 |

FOREIGN PATENT DOCUMENTS

| | | | | |
|---|---|---|---|---|
| 703231 | * | 2/1965 | (CA) | 280/47.28 |
| 300231 | * | 7/1954 | (CH) | 280/47.18 |
| 308511 | * | 11/1917 | (DE) | 280/47.24 |
| 1 194 258 | | 11/1959 | (FR) . | |
| 87/02317 | * | 4/1987 | (WO) | 280/47.29 |

\* cited by examiner

Primary Examiner—Frank Vanaman
(74) Attorney, Agent, or Firm—Reising, Ethington, Barnes, Kisselle, Learman & McCulloch, P.C.

(57) ABSTRACT

A method of constructing a bottle carrier for a two-wheeled hand truck having a normally generally vertically disposed hand truck frame comprising transversely spaced side rails joined by at least a pair of vertically spaced cross rails between its upper and lower ends includes the steps of providing a generally upright carrier frame having a projecting platform of a size to support a bottle in upright position and which incorporates a bottle girth enveloping element of a size to closely embrace the diameter of an upright bottle on the platform; and providing vertically spaced load bearing parts on the carrier frame spaced apart vertically a distance corresponding to the vertical spacing of the pair of cross rails and configured to disengagably latch the carrier against the cross-rails.

9 Claims, 4 Drawing Sheets

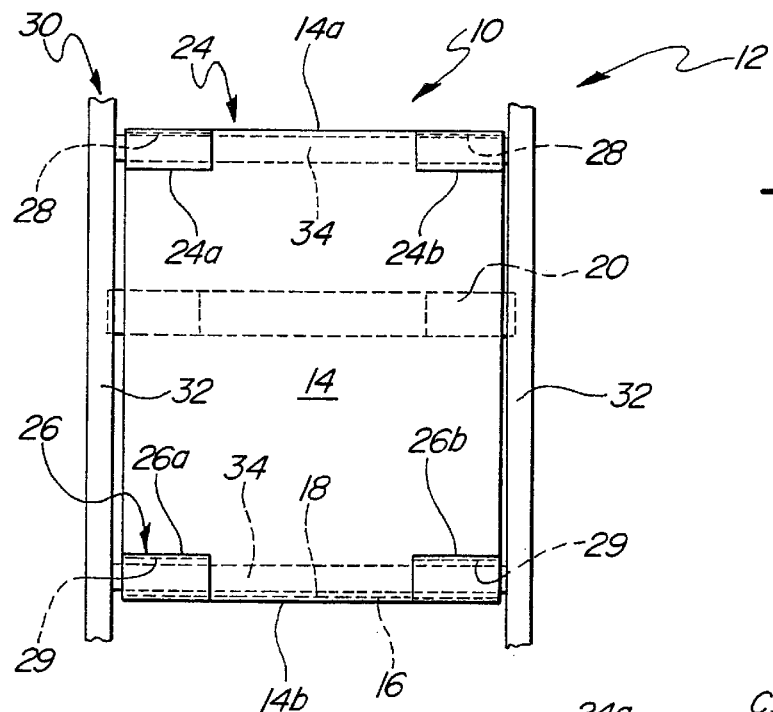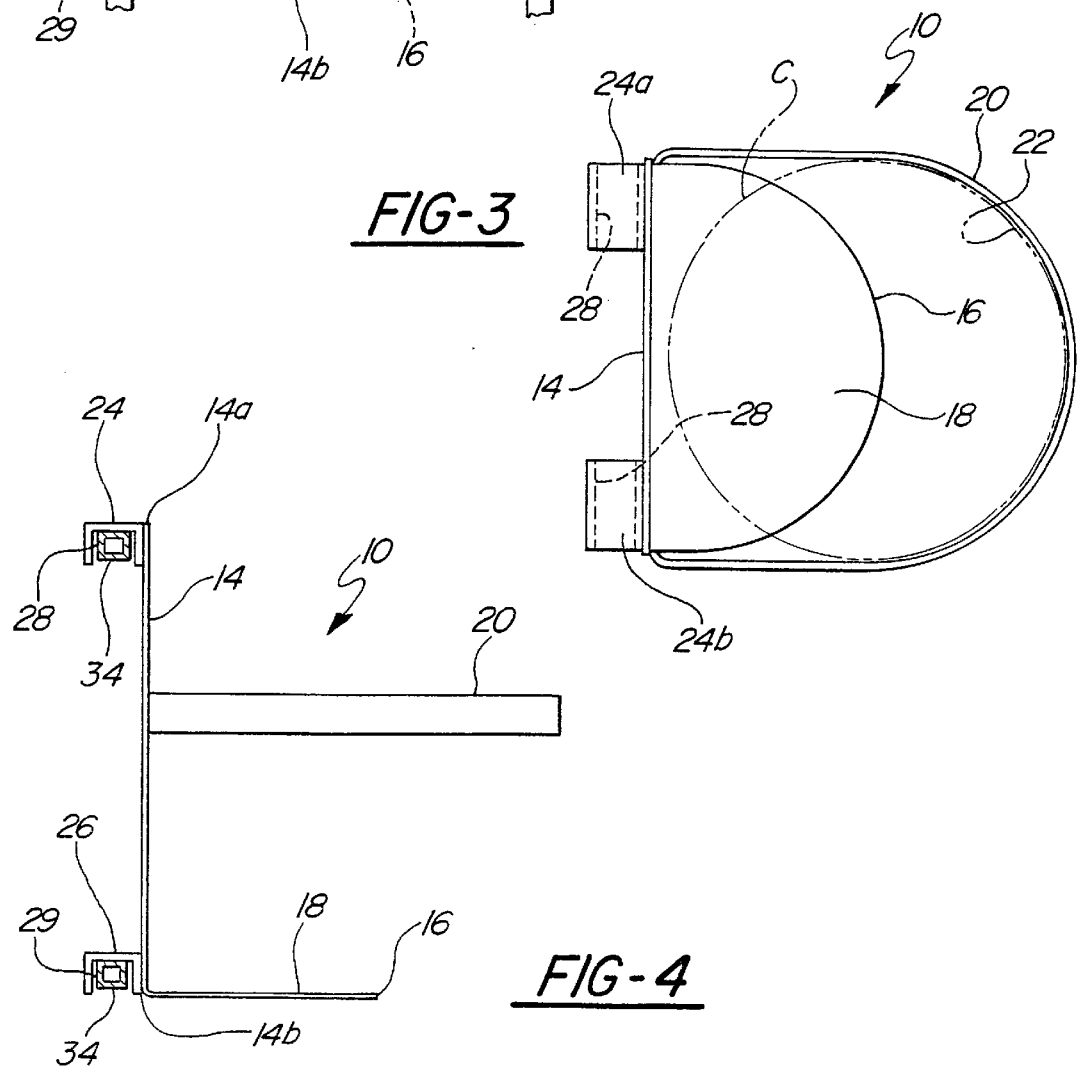

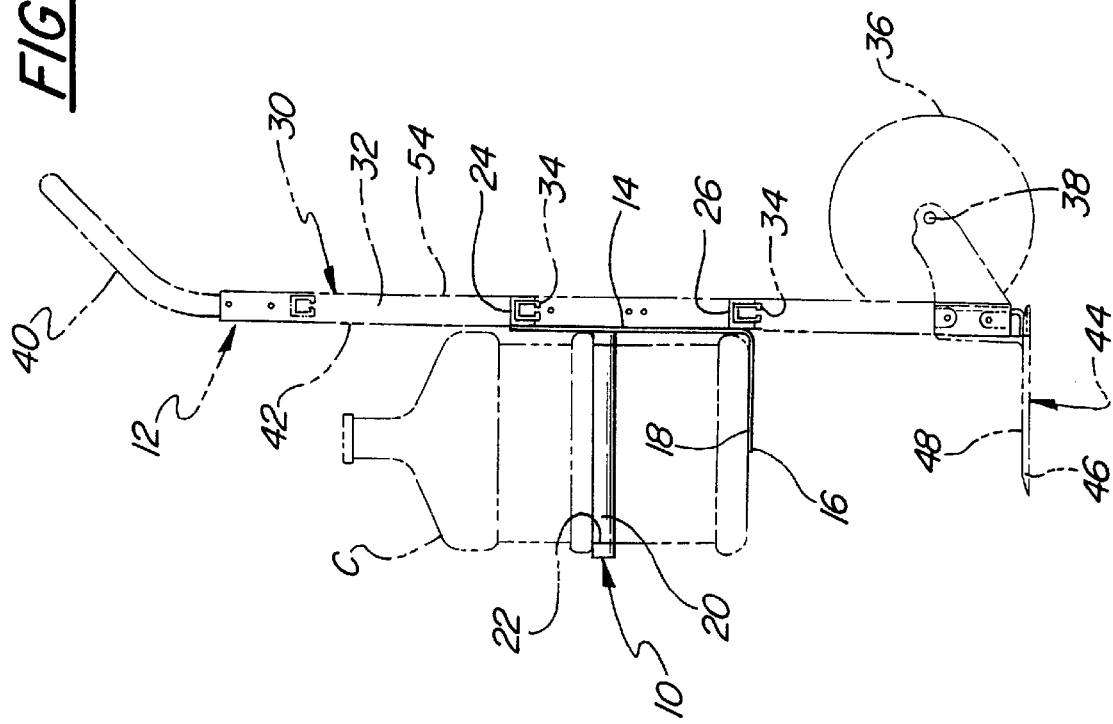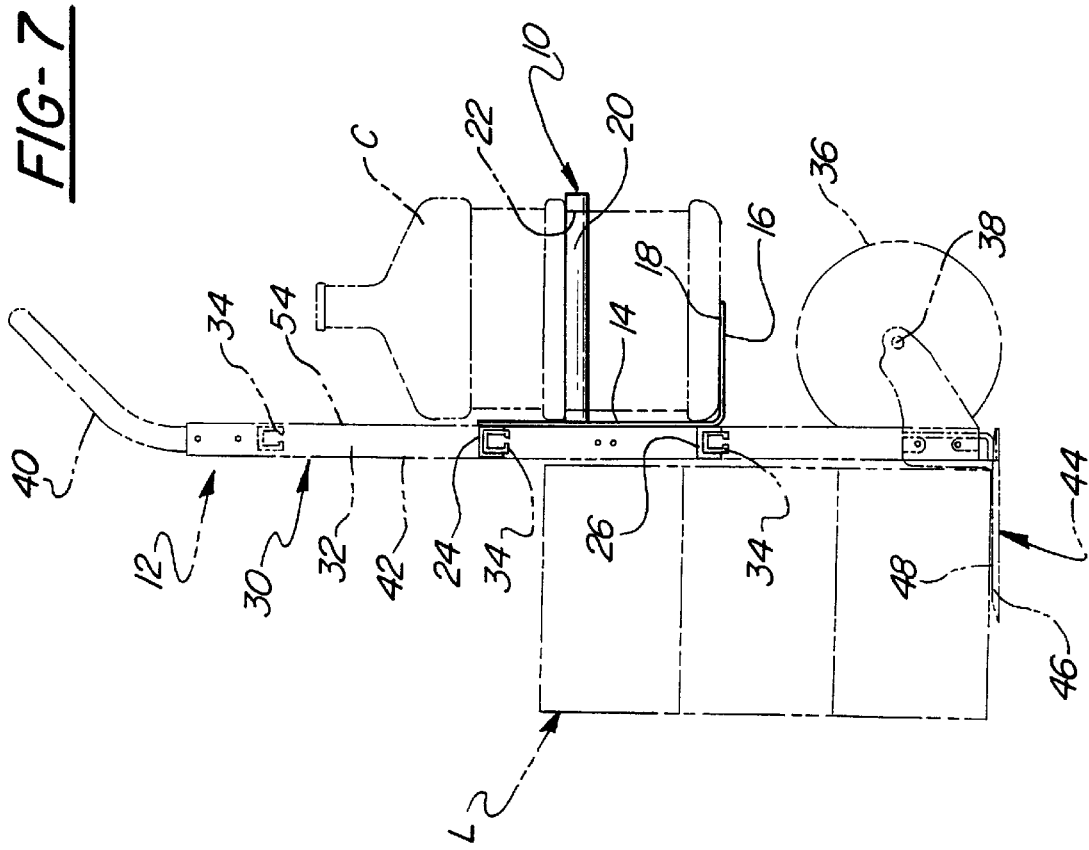

HAND TRUCK HAVING DETACHABLE CARRIER FOR BOTTLED WATER CONTAINER AND METHODS OF ITS CONSTRUCTION AND OPERATION

This application claims the priority of provisional application Serial No. 60/078,155, filed Mar. 16, 1998. The invention relates generally to two-wheeled hand trucks, and more particularly to those adapted for transporting bottled water containers.

BACKGROUND OF THE INVENTION

Drinking water is commonly packaged and sold in large glass or plastic bottles having volume capacities of about five gallons. The containers are very bulky and heavy, weighing about 50 lbs. each.

Various two-wheeled hand trucks have been devised for carrying such bottled water containers. Co-pending U.S. patent application Ser. No. 08/812,935, which I incorporate herein by reference, discloses a two-wheeled hand truck having multiple, foldable bottle-carrying trays that are mounted to the side rails of the truck and extend forwardly over the nose plate in vertically spaced relation to one another for the accommodation of up to four such containers. When not in use, the trays are foldable flush with the rails so that the hand truck can be used in the usual manner to transport other types of cargo on the nose plate.

Other known hand truck constructions include single or multiple bottle-carrying racks carried off the frame that are either fixed or foldable, but not detachable from the frame of the truck.

SUMMARY OF THE INVENTION

One of the prime objects of the present invention is to provide a carrier for such bottled water containers that is mounted releasably to the frame of a two-wheeled hand truck to serve as the sole, or as an auxiliary, carrier for bottled water containers.

Another object of the invention is to construct the bottle carrier in such manner that it mounts on the frame of a two-wheeled hand truck without modification of the standard hand truck design. In particular, it is an object of the invention to construct such a carrier to include at least one, and preferably two, hangers that releasably engage the cross braces of the truck frame to support such a container outwardly of the frame.

It is a further object to construct a carrier that can be releasably selectively hung off either the front or back side of the frame. In an application employing a conventional hand truck, the carrier could be hung from the cross braces off the front side of the frame above the nose plate. In another application in which the carrier serves as an auxiliary support for an additional water bottle on a hand truck fitted with one or multiple bottle racks that project forwardly of the frame, such as in the case of the aforementioned hand truck with multiple, foldable bottle-carrying trays, the auxiliary carrier can be mounted detachably on the cross braces off the back of the hand truck frame to provide additional carrying capacity and counterbalance.

The mount hangers for the carrier uniquely cooperate with the vertically spaced cross braces in all instances to provide the results achieved.

THE DRAWINGS

A presently preferred embodiment of the invention is disclosed in the following description and in the accompanying drawings, wherein:

FIG. 2 is a rear elevational view of the carrier of FIG. 1 mounted detachably on the frame of a hand truck;

FIG. 3 is a top view of the carrier of FIG. 2;

FIG. 4 is a side elevational view of the carrier of FIG. 2;

FIG. 6 is a side elevational view of the carrier shown mounted detachably off the front of the frame of a conventional hand truck; and FIG. 7 is a view like FIG. 5 but showing the carrier mounted off the back of the hand truck, and a load carried on the nose plate of the hand truck.

DETAILED DESCRIPTION

Figure 1:
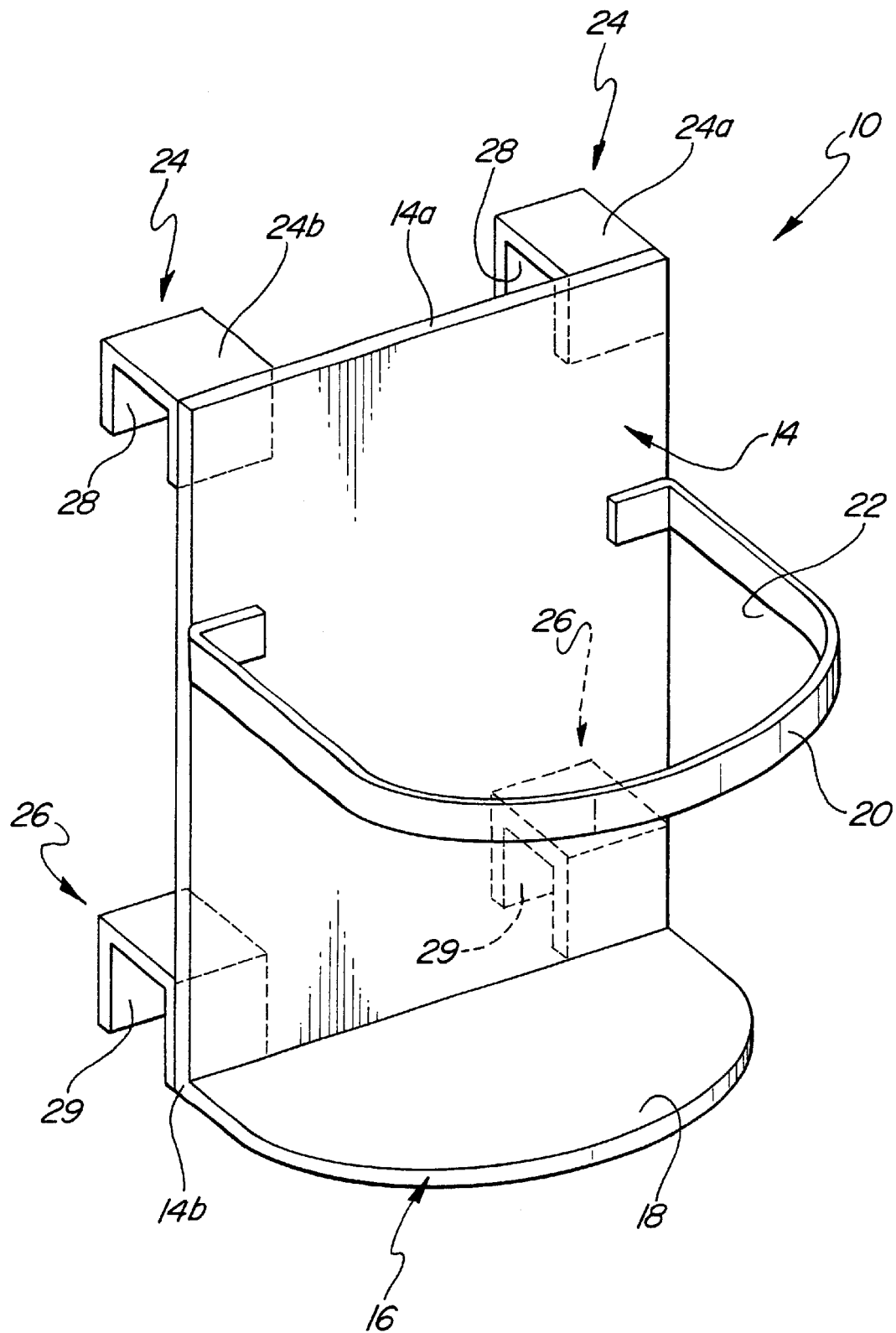
FIG. 1 is a perspective view of a detachably mountable water bottle carrier constructed according to the present invention.

A detachable bottled water carrier 10 constructed according to the present invention for a two-wheeled hand truck 12 is shown in the drawing FIGS. 1–7 and includes a generally planar, and preferably rectangular back or base wall or frame 14 having an upper end 14a and a lower end 14b. A platform or bottom 16 projects outwardly from the lower end 14b of the back wall 14, preferably at a right angle thereto, presenting an upper surface 18 sized to typically receive and support a five-gallon bottled water container C in an upright orientation.

A retaining band 20 is secured to the back wall 14 above the platform 16 about midway between the upper and lower ends 14a, 14b of the back wall 14. The band 20 encloses a space 22 that is no smaller across than the outer diameter of the bottled water container C, and preferably slightly larger than the diameter of the container C. The band 20 encircles the container C and supports the container C against tipping off the platform 16. A typical 5-gallon water container has a nominal diameter of about 10⅜ inches, and thus the space 22 should have a minimum measurement across the space 22 of at least about 10⅜ inches, although a larger space could be provided so long as it provides the recurring support to the container C to retain the container C on the platform 16. It will be understood that the space 22 is dependent on the size of the container C it is to support, and it may vary in size depending on the size of the container.

At least one, and preferably two, sets of load bearing vertically spaced hangers, parts, elements, or hooks, generally designated 24, 26, are provided on the opposite face of the back wall 14 for mounting the carrier 10 on the hand truck 12, as will be described in greater detail below. The upper hangers 24 are preferably in the form of a pair of downwardly opening hooks 24a, 24b, mounted on the opposite upper corners of the back wall 14 and defining a generally rectangular, downwardly opening channel 28 near the upper end 14a of the back wall 14. The lower hangers 26 are preferably of the same construction and comprise a pair of downwardly opening hooks 26a, 26b fixed to the back wall 14 at the opposite lower corners thereof and presenting similar downwardly opening channels 29 that are spaced a predetermined distance from the upper channels 28. The channels 28, 30 facilitate the mounting of the carrier 10 on the cross braces of the hand truck frame, which will now be described.

The hand truck 12 is typically of the type generally disclosed in U.S. Pat. Nos. 3,997,182, 5,393,081, and co-pending application Ser. No. 08/812,935 now U.S. Pat.

No. 5,913,527, all of which are commonly owned by the assignee of the present-invention, and their disclosures incorporated herein by reference.

The hand truck 12 includes a generally rectangular, load-carrying, primary or main frame 30, preferably of the type having a pair of parallel vertical side rails 32 which are preferably channel-shaped extrusions that open laterally inwardly of the frame. A plurality of vertically spaced cross braces or rails 34 extend between the side rails 32 and are secured in position by means of suitable fasteners, such as bolts, rivets, weldments or the like such that the cross braces 34 and side rails 32 constitute a rigid, fixed framework for supporting the remaining components of the hand truck. Such a mainframe construction is generally uniform in design among numerous hand trucks on the market, and particularly those manufactured by the assignee of the present invention.

Figure 5:
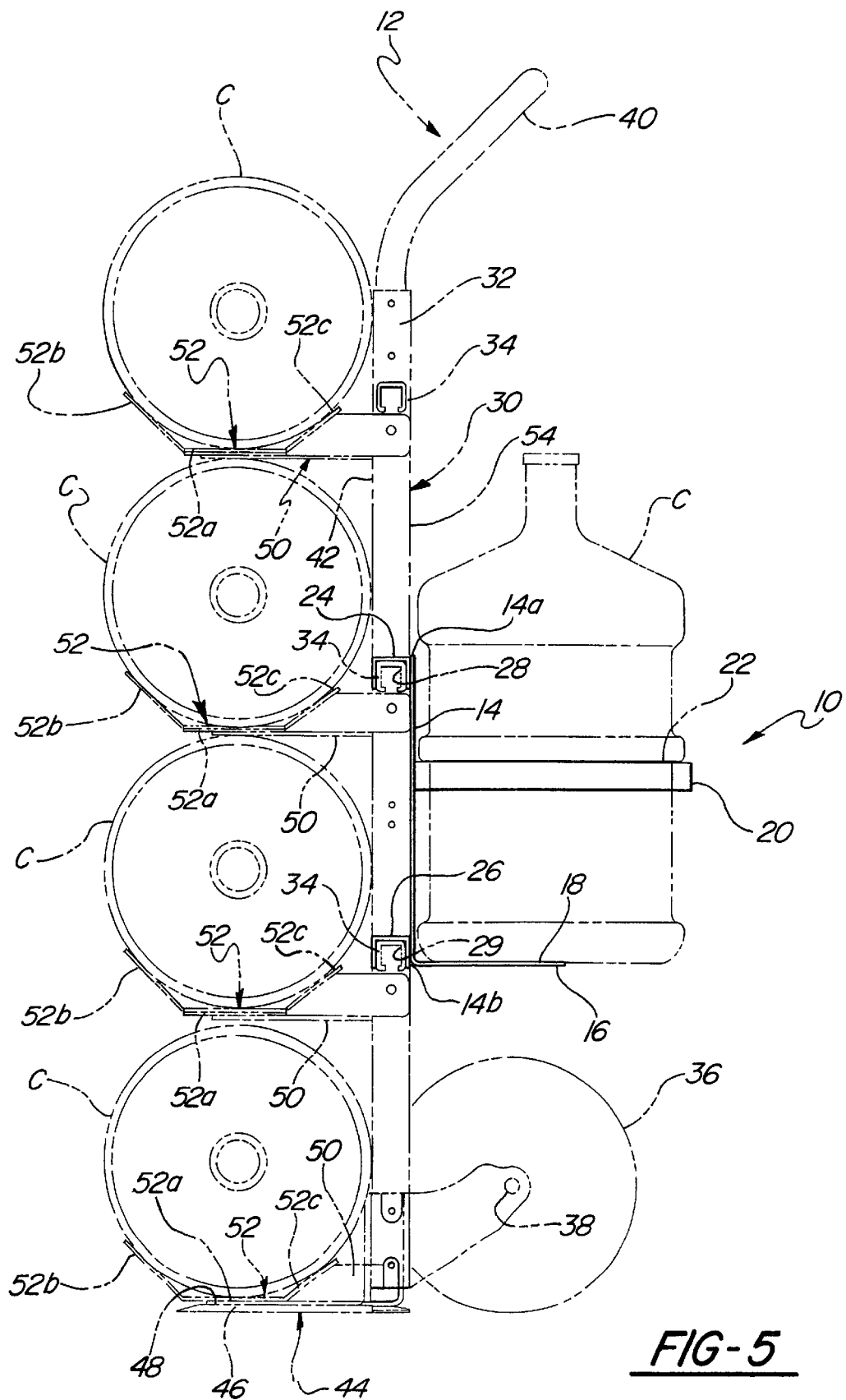
FIG. 5 is a side elevational view showing the carrier mounted detachably on a hand truck fitted with multiple, foldable bottle-accommodating trays.

The hand trucks illustrated in FIGS. 5–7 are essentially of the same design except that the hand truck of FIG. 5 includes additional bottle-accommodating trays mounted to the frame 12 that are not included in the hand truck of FIGS. 6 and 7. For simplicity, the same reference numerals will be used to designate corresponding components in the two illustrated hand truck designs, as the hand truck of FIG. 5 is essentially a modification of the basic hand truck of FIGS. 6 and 7.

The hand trucks 12 of FIGS. 5–7 include a pair of laterally spaced wheels 36 mounted on opposite ends of an axle 38 which in turn is secured to the lower end of the frame 30. A bale-shaped handle member 40 or other handle surface may be provided on the upper end of the side rails 32 according to conventional practice. Projecting forwardly from a front side 42 of the frame 30 is an angle-shaped nose piece, generally designated 44, having a forwardly extending platform 46 with an upper load-supporting surface 48, upon which a load to be transported may be supported in the usual manner.

The hand truck illustrated in FIG. 5 includes the addition of a plurality of bottle-carrying support trays 50 that are hinged to the side rails 32 and, when in use, project forwardly of the front of the frame 42 to support a corresponding plurality of the large five-gallon type bottled drinking water containers C, arranged one above the other crosswisely to the frame 12. The trays 50 define trough-shaped platforms 52 including generally rectangular bottom wall portions 52a that lie generally perpendicular to the side rails 32 when supporting the containers C, and forward and rearward product stabilizing wall portions or abutments 52b, 52c, respectively, that project upwardly and outwardly fore and aft of the bottom wall 52a at an acute angle with respect to the plane of the bottom wall portion 52a. The abutments 52b, 52c are of a restricted width and length so as to fit between the side rails 32 when the trays 50 are swung or folded to an inoperative stowed position flush with the front 42 of the frame 30.

Turning now to the operation or use of the carrier 10 with the hand truck 12 of the present invention, the upper and lower hangers 24, 26 are so located on the back wall of the carrier and their channels 28, 29 so sized as to enable the carrier 10 to be hung on the cross braces 34 of the frame 30. It will thus be appreciated that the configuration, size, and spacing of the upper and lower hangers 24, 26 corresponds to the configuration, size and spacing of the cross braces 34 of the frame 30 to enable an operator of the hand truck to attach the carrier 10 to the frame 12 by simply locating the hangers 24, 26 in position over the cross braces 34 and than lowering them into engagement with the cross braces 34.

When mounted, the offset weight of the carrier 10 and the engagement of the upper and lower hangers 24, 26 with the cross braces 34 retains the carrier 10 securely but releasably in position on the frame 30. It will be appreciated that the upper and lower brackets cooperate with one another to maintain the carrier 10 in attachment with the frame 30 during normal use of the hand truck 12. For instance, when an operator rocks the hand truck rearwardly back onto its wheels, the lower hangers 26 support the carrier 10 and the container C in position against the frame 30, restraining the lower end of the carrier and platform from swinging outwardly of the frame 30 under the forces of gravity. The operator may readily detach the carrier 10 by simply lifting the carrier vertically free of the cross braces 34.

As illustrated in FIG. 5, the carrier 10 may serve as an auxiliary bottle carrier to be used in conjunction with a hand truck having the aforementioned multiple bottle-carrying trays 50. In this application, the carrier 10 is hung off the back side 54 of the hand truck frame 30 so as not to interfere with the operation of the trays 50.

FIG. 6 illustrates an arrangement wherein the carrier 10 is serving as the primary or sole bottle carrier for a conventional hand truck, and is shown hung off the front 42 of the frame 30 in position above the nose plate 44.

FIG. 7 shows an alternative arrangement, wherein the carrier 10 is hung off the back side 54 of the same type of hand truck, leaving the platform 46 of the nosepiece 44 available to support a load L which may comprise, for example, cartons or boxes of smaller size beverage containers, or other products which are normally carried on the nosepiece 44.

The bottle carrier 10 may be constructed from any of a number of materials, provided the carrier 10 is sufficiently strong to support the weight of a bottled water container C when mounted on the hand truck frame 30. The presently preferred material for the carrier 10 is aluminum, wherein the back wall 14 and platform 16 may be formed of a single piece of aluminum sheet stock, cut and bent to the generally L-shaped configuration shown. The retaining band or girth retainer or element 20 may be made of the same or similar aluminum alloy sheet stock material, bent to a generally U-shaped configuration as shown in the top view of FIG. 3 and joined to the back wall 14 by weldments or suitable fasteners (i.e., rivets, bolts, etc.). The upper and lower hanger sets or hooks 24, 26 may be fabricated from U-shaped channel stock cut to length and fixed such as by weldments or fasteners to the backside of the back wall 14 in the manner illustrated in the drawings. They uniquely will be fixed to the wall or base plate 14 at a vertically spaced distance correlating to the spacing of cross braces 34.

Once mounted on the frame 30, the carrier 10 may support a container C by simply loading the container C onto the platform 16 in an upright position from above, whereupon the bottom of the container C is supported on the platform 16 and the band 20 and back wall 14 together encircle the container C to retain the container C on the platform 16 during transport. To unload the bottle, the user simply lifts the container C off the platform 16 through the band 20.

The disclosed embodiments are representative of presently preferred forms of the invention, but are intended to be illustrative rather than definitive thereof. The invention is defined in the claims.

I claim:

1. A method of constructing a bottle carrier for a hand truck supported on transversely spaced wheels and having a normally generally vertically disposed hand truck frame with a forwardly extending load supporting nose piece mounted at its lower end and with handle surface at its upper end, the hand truck frame comprising transversely spaced side rails joined by at least a pair of vertically spaced cross rails between its upper and lower ends above said nosepiece including the steps of:

a. providing a generally upright bottle carrier frame having a platform projecting generally perpendicularly relative to said frame of a size to support a bottle having an upper neck end and lower bottom end in upright position, and which incorporates a rigid bottle girth enveloping band projecting generally perpendicularly relative to said frame of a size to closely embrace the diameter of an upright bottle on said platform fixed to said frame above said platform to retain the bottle intermediate its upper and lower ends; and b. providing vertically spaced load bearing hookover parts on said carrier frame spaced vertically above and below said band and projecting oppositely to said band spaced apart vertically a distance corresponding to the vertical spacing of said pair of cross rails and configured to disengagably latch said carrier against the cross-rails.

2. The method of claim 1 wherein the cross rails provided are constructed with generally flat front and rear side walls jointed to a top wall, and the method comprises the further step of providing said load bearing parts with downwardly open inversely U-shaped hooks, with generally flat front and rear side walls joined to a top wall, configured with respect to said cross rails so that said front and rear walls of said hooks, as well as said hook top walls become load bearing members.

3. The method of claim 2 comprising providing said hooks in transversely spaced apart relation.

4. The method of claim 1 wherein said platform and band project in parallelism, said band projecting substantially outwardly beyond said platform.

5. In combination with a hand truck supported on transversely spaced wheels and having a normally generally vertically disposed hand truck frame with a forwardly extending load supporting nose piece at its lower end and handle surface at its upper end, the hand truck frame comprising transversely spaced side rails connected between upper and lower ends above said nose piece by at least a pair of vertically spaced cross rails; a bottle carrier comprising:

a. a generally upright bottle carrier frame having a bottom, extending outwardly generally perpendicularly therefrom and imposing an offset weight on said carrier frame, for supporting an upright bottle having an upper neck and a lower base;

b. a generally horizontally extending bottle girth enveloping band having inner end portions fixed to said frame above said bottom to retain the bottle intermediate its upper and lower ends; and c. load bearing parts on said carrier frame vertically positioned above and below said band to project oppositely to said band and configured to releasably couple said carrier frame to the hand truck frame and bear against said pair of cross rails and transfer load to each cross rail.

6. The combination of claim 5 wherein said load bearing parts comprise upper and lower hooks, hooked over said cross rails.

7. The combination of claim 5 wherein said cross rails are rectilinear and have front and rear side walls joined to a top wall; and said hooks comprise front and rear side walls joined to a top wall closely embracing said cross rails so that the offset weight of the carrier will cause said front, rear, and top walls of the hooks to transfer load to said front and rear, and top walls of said cross rails.

8. The combination of claim 5 including a series of vertically spaced bottle carrier trays on said hand truck frame above said nose piece in counterbalancing relationship with said carrier.

9. A method of transporting a bottle on a hand truck supported on transversely spaced wheels and having a normally generally vertically disposed hand truck frame with a forwardly extending load supporting nose piece mounted at its lower end and with handle surface at its upper end, the hand truck frame comprising transversely spaced side rails joined by at least a pair of vertically spaced cross rails between its upper and lower ends above said nose piece, including the steps of:

a. providing a generally upright bottle carrier frame having an upright back and a bottom projecting generally perpendicularly relative to said back of a size to support a bottle having an upper neck end and a lower base end in upright position; the carrier frame having a metal bottle girth retainer band, with portions fixed to said back above said bottom, having vertically spaced load bearing hook parts on said carrier back above and below said band spaced apart vertically a distance corresponding to the vertical spacing of said pair of cross rails and configured to disengagably couple said carrier to said cross rails;

b. mounting said carrier on the hand truck by moving said hook parts down over said cross rails; and c. loading a bottle in upright position through said band to rest on said bottom within said retainer band.

* * * * *